United States Patent [19]

Mitamura et al.

[11] 4,281,340

[45] Jul. 28, 1981

[54] HORIZONTAL SCANNING RATE CORRECTION APPARATUS FOR BEAM INDEX COLOR CATHODE-RAY TUBE

[75] Inventors: Ichiro Mitamura, Tokyo; Katsuo Isono, Kawagoe; Takashi Hosono, Yokohama, all of Japan

[73] Assignee: Sony Corporation, Tokyo, Japan

[21] Appl. No.: 99,911

[22] Filed: Dec. 3, 1979

[30] Foreign Application Priority Data

Dec. 7, 1978 [JP] Japan .............................. 53/152167

[51] Int. Cl.³ .......................................... H04N 9/24
[52] U.S. Cl. .................................................. 358/67
[58] Field of Search .................... 358/66, 67, 69

[56] References Cited

U.S. PATENT DOCUMENTS

| 4,099,092 | 7/1978 | Bristow | 315/10 |
| 4,159,484 | 6/1979 | Strathman | 358/67 |

*Primary Examiner*—Robert L. Richardson
*Attorney, Agent, or Firm*—Lewis H. Eslinger; Alvin Sinderbrand

[57] ABSTRACT

Horizontal scanning rate correction apparatus is provided for beam index color cathode-ray tubes of the type having a screen, an electron gun for projecting an electron beam upon the screen, a plurality of index elements positioned to be struck by the electron beam as it scans across the screen, a deflection device for causing the electron beam to repeatedly scan across the screen in a vertical succession of horizontal lines, and an index signal processing circuit for producing an index signal having a frequency determined by the frequency of the incidence of the electron beam upon the index elements as it scans horizontal lines and for controlling color switching circuitry which determines which of a plurality of color signals modulates the intensity of the electron beam. The horizontal scanning rate correction apparatus includes a memory circuit for storing correction values derived from the index signal processing circuit during horizontal scanning by the electron beam and representing the deviation of the horizontal scanning rate from a desired scanning rate at each of a plurality of horizontal sampling positions along a horizontal line. The apparatus further includes circuitry for reading the correction values from the memory circuit and for producing a corresponding signal which is supplied to the electron beam deflection device to substantially cancel deviations in the horizontal scanning rate.

10 Claims, 7 Drawing Figures

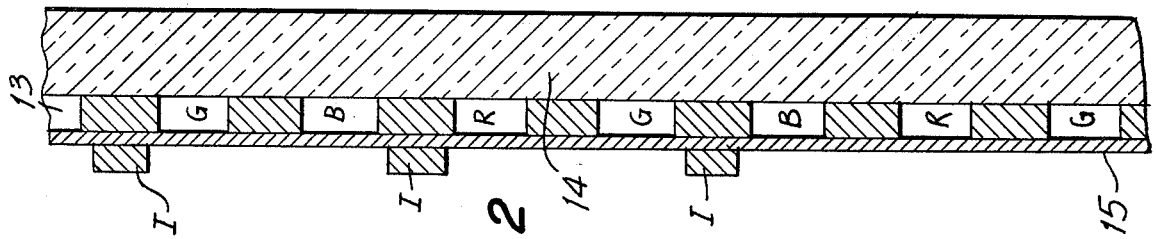
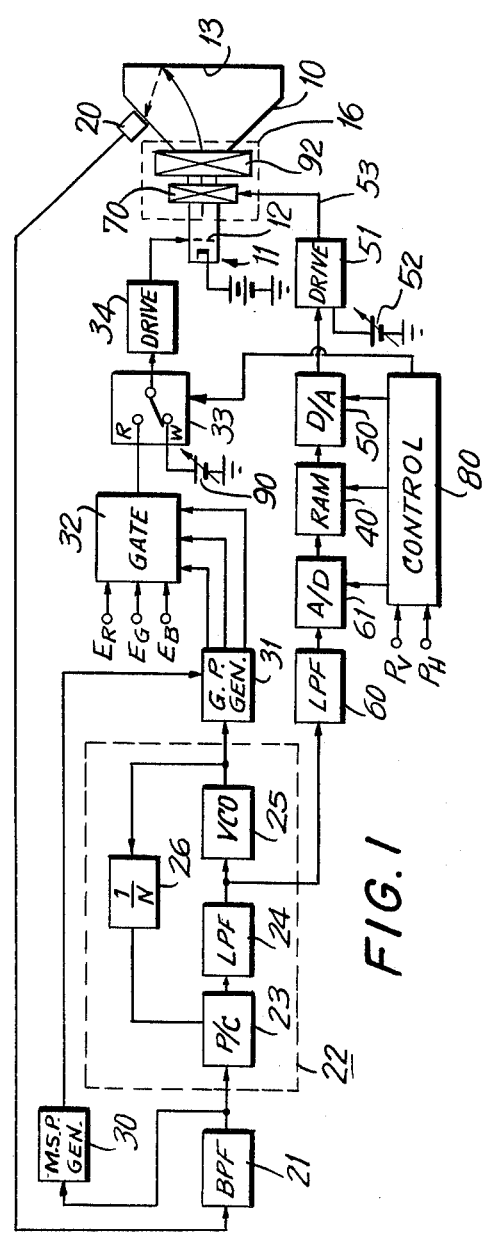
FIG.1
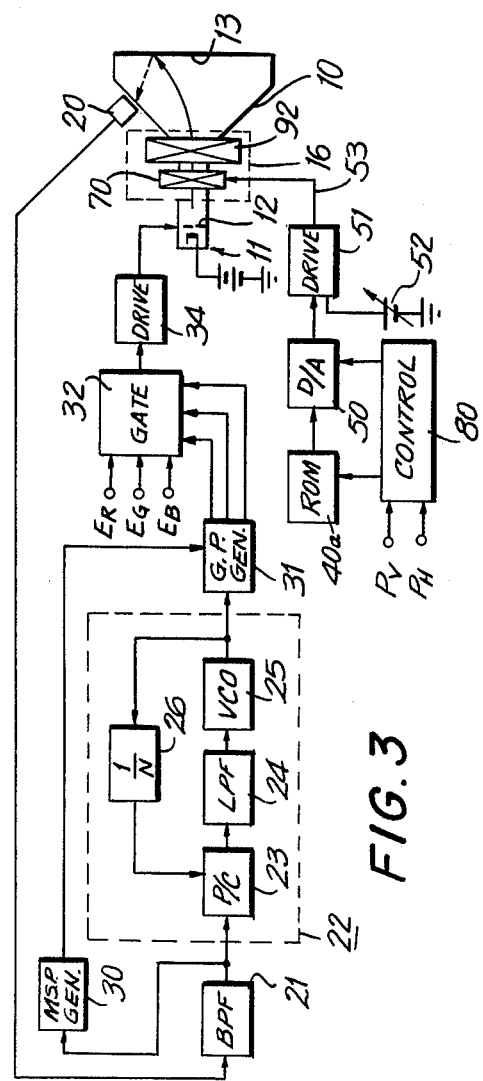
FIG.2
FIG.3

HORIZONTAL SCANNING RATE CORRECTION APPARATUS FOR BEAM INDEX COLOR CATHODE-RAY TUBE

BACKGROUND OF THE INVENTION

1. Field of the Invention

This invention relates to apparatus for controlling the horizontal scanning rate in beam index color cathode-ray tubes.

2. Description of the Prior Art

Beam index color television receivers are well known in the prior art. They usually include a cathode-ray, or picture, tube having an electron gun which emits a single electron beam and a phosphor screen having a repeating pattern of red, green and blue primary color phosphor stripes extending vertically upon the screen. The beam index picture tube also has a plurality of vertical index phosphor stripes spaced across its phosphor screen in a known relationship to the spacing of the color phosphor strips. When the electron beam horizontally scans the screen, a photodetector generates an index signal in response to the light emitted each time an index stripe is struck by the electron beam. This index signal is used to achieve color registration by controlling the color switching apparatus which determines which of the three primary color signals modulates the intensity of the electron beam, so that the intensity of the electron beam is modulated by the primary color signal whose corresponding phosphor is being scanned by the beam at that moment.

In beam index color television receivers it is important to prevent deviations in the horizontal scanning rate, because such deviations not only distort the shape of images projected upon the picture screen, as they do in other television receivers, but they also cause color misregistration. This misregistration results from the fact that the color switching apparatus which controls when each of the primary color signals modulates the electron beam does not respond instantaneously to the incidence of the electron beam upon the index stripes, but rather responds to the index signal with a delay that varies as a result of changes in the horizontal scanning rate of the beam and thus is difficult to compensate for.

This delay results from the fact that it is common for index signal processing circuitry, for example, comprised of a bandpass filter and a phase-locked loop (PLL) circuit, to be inserted between the photodetector which detects the index signal and the color switching apparatus. The bandpass filter removes unwanted noise from the index signal in preparation for the application of that signal to the input of the PLL circuit. The PLL circuit provides an input to the color switching apparatus which is more uniform in amplitude and frequency than the index signal. In addition, by insertion of a dividing circuit in the feedback loop of the PLL circuit, the latter can be made to produce an output frequency which is a predetermined multiple of the frequency of the index signal. The last feature is important since in most beam index picture tubes the number of color phosphor stripes is not equal to, but instead is an integral multiple of the number of index stripes.

Unfortunately, the delay inherently associated with the above described index signal processing circuitry, particularly with the PLL circuit, varies as a function of the frequency of the index signal, which in turn varies in proportion to the horizontal scanning rate. For this reason, deviations in the horizontal scanning rate adversely affect color registration.

Deviations in the horizontal scanning rate are also disadvantageous in beam index color television receivers because they make it more difficult for the PLL circuit to correctly follow and lock onto the instantaneous frequency of the index signal, as is necessary for proper color registration. In order to cause the PLL circuit to properly follow the frequency of an index signal when the horizontal scanning rate deviates, it is necessary to increase the minimal signal strength of the index signal. This requires that the minimal intensity of the electron beam be increased, which, in turn, has the undesirable result of increasing the luminance of the darkest areas that can be projected on the picture tube, and, thus, of decreasing the contrast of the produced image.

For the above reasons, it is desirable to limit the maximum fluctuations in the horizontal scanning rate of beam index color television receivers to less than several tenths of one percent. In the prior art, various horizontal scanning rate correction methods have been used, but unfortunately none of them has been able to limit such fluctuation to the desired level of less than several tenths of one percent.

OBJECTS AND SUMMARY OF THE INVENTION

Accordingly, it is an object of the present invention to provide horizontal scanning rate correction apparatus for beam index color cathode-ray tubes that avoids the above-described defects inherent in the prior art.

Another object of the invention is to provide horizontal scanning rate correction apparatus for beam index color cathode ray tubes by which deviations in the horizontal scanning rate from a desired value can be substantially eliminated.

A further object of the invention is to provide horizontal scanning rate correction apparatus which is simple in construction.

Yet another object of the invention is to provide horizontal scanning rate correction apparatus which corrects for deviations in the horizontal scanning rate experienced by the individual cathode-ray tube in which such correction apparatus is used.

A still further object of this invention is to provide a horizontal scanning rate correction apparatus for use in beam index color cathode-ray tubes of the type including a screen, means for projecting an electron beam upon that screen, a plurality of index elements positioned to be struck by the electron beam as it scans across the screen, a beam deflection device supplied with at least horizontal and vertical beam deflection signals for causing the electron beam to repeatedly scan across the screen in a vertical succession of horizontal lines, and an index signal processing circuit for producing an index signal of a frequency determined by the frequency of the incidence of the electron beam upon the index elements as it scans across the horizontal lines, and for controlling color switching circuitry which determines which of a plurality of color signals modulates the intensity or density of the electron beam.

In accordance with an aspect of this invention, a horizontal scanning rate correction apparatus for a beam index color cathode-ray tube, as aforesaid, includes memory means for storing correction values which represent the deviation of the horizontal scanning rate of the electron beam from a desired scanning rate at each of a plurality of selected horizontal positions along at least one of the horizontal lines scanned across the screen by the electron beam, as determined by the horizontal and vertical beam deflection signals, reading means for reading the correction values out from the memory means and for producing a deflection correction signal in accordance therewith, and means for supplying the deflection correction signal to the beam deflection device so that the deviation of the horizontal scanning rate is substantially cancelled.

According to another aspect of the invention, the index signal processing circuit includes a phase-locked loop which has a phase comparator receiving the index signal as one input, a voltage-controlled oscillator, means connected to the output of the phase comparator for supplying a control voltage to the voltage-controlled oscillator, and means for supplying to a second input of the phase comparator a second input signal having its frequency controlled by the output of the voltage-controlled oscillator. According to this aspect of the invention, the correction values are derived from the control voltage supplied to the voltage-controlled oscillator.

According to yet another aspect of the invention, the beam deflection device used in the beam index color cathode ray tube includes horizontal and vertical deflection coils for receiving the horizontal and vertical beam deflection signals, respectively, and a separate correction coil placed on a yoke separate from the horizontal and vertical deflection coils for receiving the deflection correction signal.

The above, and other objects, features, and advantages of the invention, will be apparent in the following detailed description of illustrative embodiments of the invention which is to be read in connection with the accompanying drawings.

BRIEF DESCRIPTION OF THE DRAWINGS

FIG. 1 is a block diagram of a horizontal scanning rate correction apparatus for a beam index color cathode-ray tube according to one embodiment of the present invention;

FIG. 2 is an enlarged fragmentary sectional view showing a section of the screen of the color cathode-ray tube of FIG. 1;

FIG. 3 is a block diagram of another embodiment of the present invention;

DETAILED DESCRIPTION OF PREFERRED EMBODIMENTS

Figure 6:
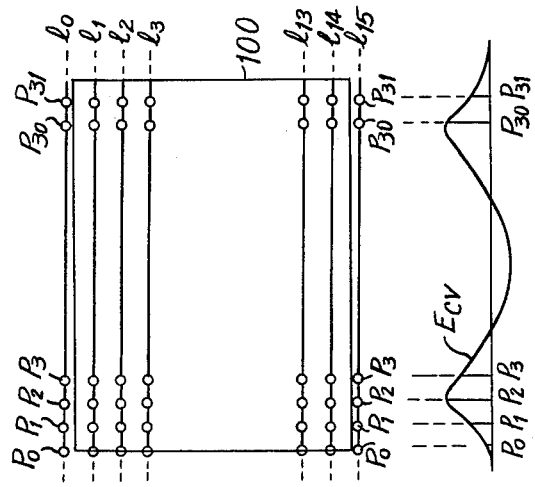
FIGS. 6 and 7 are diagrams to which reference will be made in explaining the writing and reading, respectively, of information in a memory included in the apparatus according to one embodiment of the present invention.

Referring first to FIG. 1, it will be seen that a beam index color cathode-ray or picture tube 10 to which this invention may be applied is provided with an electron gun 11 that emits a single electron beam, the intensity or density of which is modulated by a signal applied to a grid electron 12 forming part of electron gun 11. Picture tube 10 also includes a phosphor screen 13 composed of a repeating pattern of red, green and blue primary color phosphor stripes R, G, B (FIG. 2) extending vertically upon the inner surface of the glass face-plate or panel 14 of picture tube 10. A thin metallic layer 15, for example, of vacuum deposited aluminum, covers the inner surface of screen 13 and is transparent to electrons of the electron beam while being effective to reflect toward the viewer the light emitted by the color phosphor stripes. Picture tube 10 also has a plurality of vertical index phosphor stripes I spaced across layer 15 on the inside surface of phosphor screen 13 in a known relationship to the spacing of color phosphor stripes R, G and B. A beam deflection device 16 is supplied with horizontal and vertical beam deflection signals for causing the electron beam emitted by electron gun 11 to repeatedly scan across screen 13 in a vertical succession of horizontal lines.

An index signal processing circuit is associated with tube 10 and shown to be comprised of a photodetector 20, a band-pass filter 21 and a phase-locked loop (PLL) circuit 22. Such PLL circuit 22 includes a phase-comparator 23, a low-pass filter 24, a voltage-controlled oscillator 25, and a frequency divider 26. The index signal processing circuit is used for controlling color switching circuitry comprised of a mode set pulse generator 30, a gate pulse generator 31, and a gate circuit 32, which determines when each of a plurality of color signals $E_R$, $E_G$ or $E_B$ is supplied to grid 12 so as to modulate the intensity or density of the electron beam.

When the electron beam emitted by electron gun 11 horizontally scans screen 13, photodetector 20 provided at the funnel-shaped portion of picture tube 10 generates an index signal in response to the light emitted each time that an index stripe I is struck by the electron beam. The output signal from photodetector 20 is applied to bandpass filter 21 for the purpose of removing from the index signal certain signal components, such as, those generated during the flyback period, which have frequencies different than the frequency with which the electron beam strikes index stripes I during horizontal scanning intervals. The resulting index signal produced at the output of band-pass filter 21 has a frequency determined by the distance between index phosphor stripes I and the scanning speed of the electron beam. The index stripes I are spaced across the screen 13 so that the basic distance between index stripes I remains constant along a given horizontal line scanned by the electron beam and thus so that the frequency of the index signal varies in proportion to the horizontal scanning rate of the beam. The index signal from the output of bandpass filter 21 is applied to one input of phase comparator 23 in PLL circuit 22. The variable output voltage of phase comparator 23 is applied, through low-pass filter 24 which removes unwanted noise therefrom, to the control input of voltage-controlled oscillator 25 which has a control frequency N times the normal frequency of the index signal. The output from voltage-controlled oscillator 25 is supplied to the input of frequency divider 26 which divides the frequency of the output from voltage-controlled oscillator 25 by N, where N is an integral value representing the number of color phosphor stripes R, G, B between adjacent index phosphor stripes I. The output of frequency divider 26 is supplied to a second input of phase comparator 23 for phase comparison with the index signal derived from the output of bandpass filter 21.

As a result of the foregoing arrangement of PLL circuit 22, the output of the voltage-controlled oscillator 25 will vary in frequency until the two input signals supplied to phase comparator 23 are of the same frequency. As a result, the output of voltge-controlled oscillator 25 will have a frequency which is N times as great as the frequency of the index signal and three times as great as the so-called triplet frequency at which the repeating pattern of red, green and blue color phosphor stripes R, G, B are scanned by the electron beam, so that one pulse is generated by voltage-controlled oscillator 25 for each of the color phosphor stripes being scanned.

The frequency generated by voltage-controlled oscillator 25 varies in proportion to the control voltage which is supplied to its input by low-pass filter 24. Each time the frequency of the index signal supplied to the input of phase comparator 23 is varied, PLL circuit 22 tends toward a new equilibrium at which the frequency of the two inputs to phase comparator 23 is equal but at which the phase of the two inputs differs as a function of the frequency of the index signal. At each disturbance of such equilibrium, the resulting change in the phase difference between the signal supplied by the frequency divider 26 and the index signal supplied by bandpass filter 21 causes phase comparator 23 to generate an output voltage which, when applied through low-pass filter 24, causes voltage-controlled oscillator 25 to suitably vary its output frequency and phase for restoring the equilibrium at comparator 23. Thus, it can be seen that the voltage supplied by phase comparator 23 through low pass filter 24 to the input of voltage-controlled oscillator 25 varies with changes in the frequency of the index signal.

The output of PLL circuit 22 is applied to gate pulse generator 31, which, for example, may include a ring counter (not shown). Gate pulse generator 31 responds to each output pulse from voltage-controlled oscillator 25 by producing either a red, a green, or a blue gating pulse, in response to the count of its ring counter. The resulting repeated sequence of red, green and blue gating pulses are 120 out of phase from each other and are supplied to respective control inputs of gate circuit 32. In response to these repeated sequences of gating pulses, suitable gates (not shown) in gate circuit 32 sequentially select either a red, a green or a blue primary color signal, $E_R$, $E_G$, and $E_B$, respectively, and supply it through the R contact of mode switch circuit 33 to the input of drive circuit 34 which, in turn, provides the selected color signal to grid 12 so that it can modulate the intensity or density of the electron beam projected upon screen 13.

The index signal from bandpass filter 21 is also applied to mode set pulse generator 30 which is used to determine the phase relationship between the red, green and blue gating pulses from generator 31, and the scanning of the three primary color phosphors R, G, B. Such mode set pulse generator is provided where the phase relationship between the index signal and the color phosphor stripes R, G, B is not constant, for example in cathode-ray tubes in which the index stripes I are usually separated by only two color phosphor stripes, as is shown in FIG. 2, rather than by a full set of all three color phosphor stripes. Mode set pulse generators are known in the prior art, and they operate, for example, by determining the position of the electron beam upon screen 13 by counting the pulses of the index signal.

When mode set pulse generator 30 determines that a specified phase relationship exists between the index signal and the scanning of color phosphors by the beam, it generates a mode set pulse which is applied to gate pulse generator 31. The mode set pulse causes the ring counter within gate pulse generator 31 to be set so that the gating pulses thereafter generated are in phase with the colors of the phosphors then being scanned.

There are inevitable delays between the time that a particular index stripe I is struck by the electron beam and the time that the color signal, $E_R$, $E_G$ or $E_B$, associated with a particular primary color is supplied to grid 12 in response to the resulting pulse of the index signal. For example, there are time delays introduced by the operation of bandpass filter 21 and PLL circuit 22. In order to maintain proper color registration of the image produced upon screen 13 it is necessary that such delays be compensated for so that the operation of gate circuit 32 can be accurately synchronized with the actual scanning position of the electron beam, and so that primary color signals $E_R$, $E_G$, and $E_B$ modulate the electron beam as that beam scans the corresponding color phosphor stripes R, G, and B, respectively. If such time delays are constant they can easily be compensated for by properly choosing the timing parameters of the components in the feedback loop constituted by photodetector 20, bandpass filter 21, PLL circuit 22, gate pulse generator 31, gate circuit 32, drive circuit 34 and picture tube 10. Unfortunately, the delay associated with that feedback loop, particularly the delay associated with the phase difference between the two inputs of phase comparator 23, varies as a function of the frequency of the index signal. For this reason, deviations in the horizontal scanning rate of the electron beam upon screen 13 make it difficult to maintain proper color registration.

In accordance with the present invention, apparatus is provided for substantially eliminating the deviations in the horizontal scanning rate which tend to cause color misregistration in beam index color cathode-ray tubes such as the one described above. Such apparatus includes a memory 40 for storing correction values which represent the deviation of the horizontal scanning rate from a desired scanning rate at each of a plurality of horizontal sampling positions along at least one sampled horizontal scanning line. The correction values are obtained from the index signal processing circuit, comprised of photodetector 20, bandpass filter 21 and PLL circuit 22, when the electron beam is made to scan the sampled horizontal line in accordance with the horizontal and vertical beam deflection signals. The apparatus also includes a reading means, comprised of a digital-to-analog converter 50, a drive amplifier 51, and an adjustably fixed voltage source 52, for reading correction values from memory 40 and for producing a deflection correction signal in accordance with the correction values that are read. The apparatus further includes means, for example, constituted by a wire 53 connected to the output of drive amplifier 51, for supplying the deflection correction signal to the beam deflection device 16 so that deviation of the horizontal scanning rate is substantially cancelled. In the embodiment of the invention shown in FIG. 1, the apparatus according to the invention also includes writing means, for example, comprised of a low-pass filter 60 and an analog-to-digital converter 61, for obtaining correction values from the index signal processing circuit and for writing those correction values in memory 40.

Figure 5:
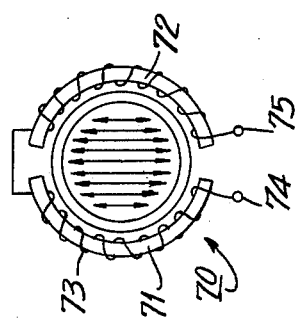
FIG. 5 shows a correction coil included in the deflection yoke of a beam index color cathode-ray tube according to one embodiment of the present invention.

In the embodiment of the invention shown in FIG. 1, low-pass filter 60 has its input connected to the output of low-pass filter 24 so as to receive the control voltage supplied from low-pass filter 24 to voltage-controlled oscillator 25. The output of low-pass filter 60 is connected to the input of analog-to-digital converter 61, and the digital output of analog-to-digital converter 61 is supplied to the data input of memory 40, which may be comprised of random-access memory capable of writing, storing, and reading a plurality of digital values each at a respective memory address. The data output of memory 40 is connected to the input of digital-to-analog converter 50, and the output of digital-to-analog converter 50 is connected to drive amplifier 51, which may be a differential amplifier having a second input connected to adjustably fixed voltage source 52. The output of drive amplifier 51 is supplied to a deflection correction device 70, which constitutes part of the beam deflection device 16, and which may be desirably formed, as shown in FIG. 5, by a pair of ferrite cores 71 and 72 of a semi-annular shape which are placed in horizontally opposing positions from each other around the usual fourth grid of the electron gun in the neck portion of the picture tube 10. A correction coil 73 having two ends 74 and 75 is wrapped around the cores 71 and 72, and the deflection correction signal is supplied between ends 74 and 75 so that a magnetic field will be induced in the vertical direction, as indicated by the arrows on FIG. 5, to horizontally deflect the electron beam.

The horizontal correction apparatus is controlled by a control circuit 80 which receives, as its inputs, suitably separated or generated vertical and horizontal video synchronization signals, $P_V$ and $P_H$, respectively. Control circuit 80 is connected to analog-to-digital converter 61 and digital-to-analog converter 50 so as to supply clocking signals to those converters for determining the times at which they make their respective conversions. Control circuit 80 is also connected to memory 40 so as to apply thereto WRITE, READ and address signals for controlling whether values from converter 61 are written in memory 40 or whether values are read from memory 40 and supplied to converter 50. The address signals determine at which, or from which, memory address such digital values are written or read. In addition, control circuit 80 is connected to mode switch 33, which has two fixed contacts R and W selectively engaged by a movable contact under the influence of control circuit 80 for electrically connecting either of the two fixed contacts to the input of drive circuit 34. Fixed contact R is connected to the output of gate circuit 32, and fixed contact W is connected to a means for supplying a constant signal, such as, a variably fixed voltage source 90. Although mode switch 33 is shown in FIG. 1 as a mechanical switch, it will be obvious to those skilled in the art that a solid-state switching device could be used in its place.

In operation, the apparatus of FIG. 1 functions in one or the other of two modes, that is, a WRITE mode, in which correction values are derived from the control voltage supplied to voltage-controlled oscillator 25 and are recorded in memory 40, and a READ mode, in which correction values are read from memory 40, and in which a deflection correction signal is produced in accordance with the read correction values and is supplied to deflection correction device 70, so that deviations in the horizontal scanning rate are substantially cancelled. Mode switch 33 is effective to change over the apparatus of FIG. 1 between the WRITE and the READ modes, and, as in the embodiment of the invention being described with reference to FIG. 1, mode switch 33 may be operated automatically by control circuit 80, so that, whenever the television receiver including the circuitry of FIG. 1 is initially turned on, the apparatus will be set to operate in the WRITE mode until all of the correction values have been written, and then control circuit 80 causes the apparatus to be changed over to the READ mode in which the apparatus functions to reproduce video signals on screen 13.

When mode switch 33 is positioned to establish the WRITE mode by the operation of control circuit 80, the input of drive circuit 34 is connected to fixed contact W. As a result, fixed voltage source 90 is connected through drive circuit 34 to grid 12 so as to make the current in the electron beam projected upon screen 13 constant. During the WRITE mode this constant intensity electron beam is caused to scan across the screen 13 under the influence of the horizontal and vertical beam deflection signals supplied to horizontal and vertical deflection coils 92, which constitute parts of beam deflection device 16 separate from deflection correction device 70. As a result, an index signal is detected by photodetector 20, filtered by bandpass filter 21 and supplied to PLL circuit 22. This index signal has a frequency that varies in response to any changes in the scanning speed of the electron beam across screen 13 under the influence of horizontal and vertical deflection coils 92.

In response to this index signal, the PLL circuit 22 produces a control voltage at the output of low-pass filter 24 which varies in proportion to changes in the frequency of the index signal and, thus, in proportion to changes in the horizontal scanning rate. This control voltage is supplied through low-pass filter 60 to the input of analog-to-digital converter 61. Control circuit 80 supplies clock pulses to analog-to-digital converter 61 and address and WRITE signals to memory 40 in synchronism with the vertical and horizontal synchronizing signals $P_V$ and $P_H$, so that the control voltage filtered by low-pass filter 60 is converted into a digital value by analog-to-digital converter 61 during the scanning by the electron beam of each of a plurality of horizontal sampling positions along a sampled horizontal line and recorded in memory 40 at an address corresponding to each of those horizontal sampling positions.

The function of low-pass filter 60 is to remove from the control voltage supplied to analog-to-digital converter 61 those variations that have a high frequency relative to the frequency at which converter 61 samples the control voltage and converts it into digital values, so that the resulting correction values stored in memory 40 represent the average value of the control voltage at the time that each such sampling is made.

In the embodiment of the invention shown in FIG. 1, memory 40 is comprised of random-access memory (RAM). Random-access memory normally loses the values stored in it when its power is shut off. For this reason, control circuit 80 causes the apparatus of FIG. 1 to be briefly set to its WRITE mode each time it is turned on, so that correction values will be stored in memory 40 before the subsequent operation of the apparatus in the READ mode.

After a complete set of correction values has been stored in memory 40, control circuit 80 causes the apparatus of FIG. 1 to be changed over to the READ mode in which mode switch 33 connects the input of the drive circuit 34 through contact R to the output of the gate circuit 32. Thus, in the READ mode, color signals $E_R$, $E_G$, and $E_B$ are sequentially supplied through drive circuit 34 to grid 12 in the manner described above, so that color video images are reproduced upon screen 13. In addition, in the READ mode, control circuit 80 causes the correction values stored at various addresses in memory 40 to be read and applied to digital-to-analog converter 50 for conversion to a corresponding analog voltage. This analog voltage or signal is then applied through drive amplifier 51 to deflection correction device 70 to cancel unwanted deviations in the horizontal scanning rate. Control circuit 80 receives the vertical and horizontal synchronizing signals $P_V$ and $P_H$, so that the address and READ signals which it supplies to memory 40 and the clock signals which it supplies to digital-to-analog converter 50 are properly synchronized with the scanning motion of the electron beam and so that the deflection correction signal supplied by drive amplifier 51 to correction coil 73 is derived from a correction value stored at an address in memory 40 corresponding to the current scanning position of the electron beam and representing the previously determined deviation of the horizontal scanning rate at that scanning position.

It will be appreciated from the foregoing that the apparatus shown in FIG. 1 is designed so that the deflection correction signal supplied to coil 73 generates a magnetic field sufficient to substantially cancel unwanted deviations in the horizontal scanning rate. The correction values stored in memory 40 vary in proportion to the frequency of the index signal at various horizontal sampling positions when the apparatus was last operated in the WRITE mode. When the apparatus is operated in the READ mode, correction values are read from memory 40, converted to proportionally corresponding analog voltages, and supplied to the input of drive amplifier 51. Since drive amplifier 51 is a differential amplifier which has a second input voltage supplied to it from adjustably fixed voltage source 52, which voltage is adjusted to equal the output of digital-to-analog converter 50 that would result upon the reading of a correction value from memory 40 representing the desired horizontal scanning rate, the voltage of the deflection correction signal produced by drive amplifier 51 varies in proportion to the horizontal scanning rate error, that is, in proportion to the difference between a desired horizontal scanning rate and the horizontal scanning rate at the time that the correction value currently being read was recorded.

The voltage of the deflection correction signal is integrated by the inductance of coil 73 to produce a current in that coil and a resulting magnetic field which are both proportional to the integral of the horizontal scanning rate error. The horizontal scanning rate of the electron beam is altered by an amount substantially proportional to the rate of change of the magnetic field created by the flow of the current in coil 73. As a result, the horizontal scanning rate is altered by an amount substantially proportional to the differential of the integral of the horizontal scanning rate error, that is, by an amount substantially proportional to the horizontal scanning rate error itself. Thus, by connecting the deflection correction signal to coil 73 with the proper polarity, it is possible to substantially cancel the horizontal scanning rate error of picture tube 10.

As discussed above, the apparatus shown in FIG. 1 has a WRITE mode in which new correction values can easily be recorded in memory 40, for example, when the apparatus is first turned on. In FIG. 3, in which components similar to those of FIG. 1 are similarly labeled and identified by the same reference numerals, an embodiment of the present invention is disclosed which is identical to that of FIG. 1 except for the fact that it does not provide means for operation in a WRITE mode. In the apparatus of FIG. 3, memory 40a is comprised of read-only memory (ROM) and correction values are written in that memory 40a by means of circuitry external to the apparatus, for example, circuitry at the factory where the apparatus is manufactured, or at a repair shop where such apparatus might be serviced. Although the apparatus of FIG. 3 has the disadvantage of not being able to have its correction values renewed as frequently, or as easily, as the apparatus shown in FIG. 1, it has the offsetting advantage of not requiring the writing means required by the apparatus of FIG. 1, such as is constituted by mode switch 33, low-pass filter 60, analog-to-digital converter 61, and that portion of control circuit 80 which relates to the writing of correction values.

The apparatus disclosed in FIGS. 1 and 3 will have enough information to accurately compensate for deviations in the horizontal scanning speed of a given horizontal line if the control voltage $E_{CV}$, shown graphically at the bottom of FIG. 6, supplied to voltage-controlled oscillator 25 is converted by analog-to-digital converter 61 and recorded in memory 40 for each of 32 sampling positions indicated at $P_0$, $P_1$, $P_2$ ... $P_{30}$ and $P_{31}$ on FIG. 6, along that given horizontal line. In order to achieve the most accurate correction of deviations in the horizontal scanning rate, it would be desirable to record correction values for each of such 32 sampling positions along each of the over 200 horizontal lines within the effective picture or image area 100 of a video field. Unfortunately, this would require memory 40 to have a very large storage capacity, which would result in an undesirable increase in cost. To avoid such difficulties, it is possible to suitably program control circuit 80 to cause the storage of 32 correction values, one for each of 32 horizontal sampling positions, $P_0$–$P_{31}$, on each of 16 predetermined horizontal sampling lines, $L_0$, $L_1$, $L_2$ ... $L_{14}$, and $L_{15}$. These 16 sampling lines, $L_0$–$L_{15}$, could be spaced at every 16th horizontal line throughout a given video field so that, as shown in FIG. 6, 14 of the sampling lines would lie within the effective picture portion 100 of a video field, and two lines $L_0$ and $L_{15}$, would lie in portions of the raster scan occurring, respectively, before and after the effective picture portion 100, that is, above and below the image area. The storage of correction values for only one in each 16 horizontal lines greatly reduces the capacity required of memory 40.

In the case in which memory 40 has correction values stored for only the 16 sampling lines $L_0$–$L_{15}$, it is necessary to provide a way for supplying a deflection correction signal to deflection correction means 70 during the reproduction of the 15 horizontal lines which occur between adjacent sampling lines. The simplest way of doing this is by having control circuit 80 suitably programmed to read from memory 40 the same 32 correction values during the scanning of each of those 15 horizontal lines that would be read from memory 40 at corresponding time periods during the scanning of the immediately preceding sampling line. Although this technique is very simple, the correction it makes in horizontal scanning speed may be less than perfect, as illustrated in FIG. 7.

Figure 7:
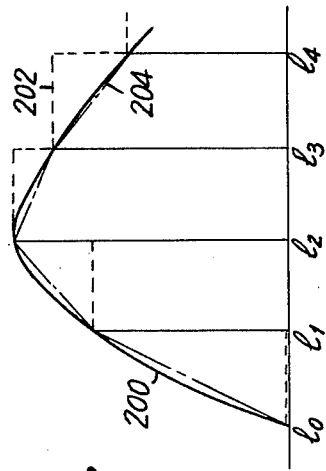

The solid line 200 in FIG. 7 represents the changes in horizontal scanning rate that occur at a given horizontal location as a function of changes in vertical position within a video field. If these changes in horizontal scanning rate are recorded only for the predetermined sampling lines, such as the lines $L_0$–$L_4$ shown in FIG. 7, and if the correction values recorded for each of these predetermined sampling lines are used as the correction values for each of the subsequent 15 horizontal lines, then the deflection correction signal supplied to deflection correction means 70 will have a discontinuous function as shown by broken line 202 in FIG. 7. The resulting discontinuities in the deflection correction signal may give rise to the appearance of horizontal bands in the image produced by picture tube 10. To avoid these problems, it is desirable to suitably program control circuit 80 so that, when one of the 15 lines between adjacent sampling lines is being reproduced, the corresponding correction value from the sampling line immediately preceding, and the correction value from the sampling line immediately after, the currently scanned horizontal line will be read from memory 40 and the applied correction deflection signal will be determined by interpolating between these two correction values on the basis of the relative vertical distance of the currently scanned horizontal line from the immediately preceding, and immediately subsequent sampling lines. If such interpolation is linear, the correction deflection signal will vary as a function of vertical position in the manner shown by the chain line 204 of FIG. 7. Thus, by use of such interpolation it is possible to produce an apparatus which can effect substantially accurate correction of deviations in the horizontal scanning rate throughout all of the video field without requiring a huge storage capacity in memory 40.

Figure 4:
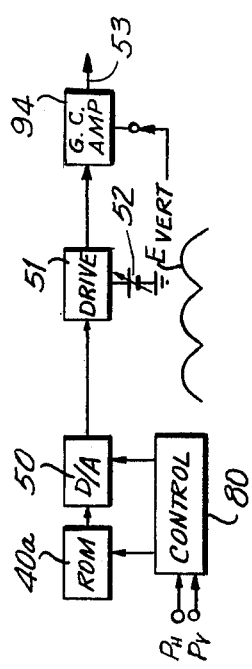
FIG. 4 is a block diagram of a portion of still another embodiment of the invention.

In cathode-ray tubes of the type in which the horizontal scanning rate along all horizontal lines is substantially similar except for a factor associated with the vertical position of each horizontal line, a single horizontal line, for example, at the center of the video field, may be sampled and have its corresponding correction values stored in memory 40. In such a case, apparatus such as that shown in FIG. 4 can be used to produce a deflection correction signal. This apparatus reads each of the correction values corresponding to the sampled line from memory 40 during the scanning of each horizontal line and converts those correction values into a corresponding analog voltage in digital-to-analog converter 50. This analog voltage is supplied to drive amplifier 51 which produces a deflection correction signal that varies in proportion to the horizontal scanning rate error of the sampled line. The deflection correction signal is supplied to the input of a means for multiplying it, in the form of a gain control amplifier 94. A gain control signal is suitably applied to gain control amplifier 94 to multiply the deflection correction signal by a coefficient that varies as a function of the vertical position of the horizontal line currently being scanned to compensate the deflection correction signal for changes in the horizontal scanning rate associated with changes in that vertical position. For example, the gain control signal supplied to amplifier 94 could be one which varies parabolically with the vertical position of the horizontal scanning line, such as the signal $E_{vert}$ shown in FIG. 4. The signal from amplifier 94 is then applied to deflection correction coil 73 to correct for deviations in horizontal scanning rate along each of the horizontal lines of the video signal reproduced upon screen 13.

By way of summary, it will be appreciated that, in the above described apparatus in accordance with this invention, correction values derived from the index signal processing circuit used in conjunction with a beam index color cathode-ray tube and representing the deviation of the horizontal scanning rate of an electron beam across the screen of that cathode ray tube are stored and subsequently read out from a memory to correct for those deviations when a video image is reproduced. Such apparatus not only compensates for deviations in the horizontal scanning rate which can be predicted from the design of the cathode-ray tube, but it also compensates for deviations in the horizontal scanning rate which may result from the unpredictable irregularity of circuit components within a given individual cathode-ray tube with which it is used. As a result, the horizontal scanning rate of such cathode-ray tubes can be kept substantially constant, preventing distortion of the shapes of the images reproduced and preventing color misregistration.

The substantially constant frequency of the index signal made possible by this invention enables PLL circuit 22 to maintain synchronism with the index signal, even when that signal is weak, for example, due to a low beam current associated with the reproduction of a dark image area upon screen of the picture tube. As a result, this invention makes it possible to lower the minimum electron beam current while still maintaining synchronization of the PLL circuit, allowing low luminance portions of a video signal to be darker when reproduced, and, thus, improving the contrast of the resulting picture tube image.

It will be apparent that with appropriate changes in the drive amplifier 51 the deflection correction means used with this invention could be of an electrostatic type. Furthermore, it will be apparent that the deflection correction means could make use of the main horizontal deflection coil 92 of the cathode ray tube for achieving its desired effect. For example, a saturable reactor may be employed which has the deflection correction signal supplied to its primary winding and which has its secondary winding connected in series with the horizontal deflection winding of the cathode ray tube so that the deflection correction signal can be used to vary the magnitude of the horizontal beam deflection signal which would normally be applied to the horizontal deflection winding.

Furthermore, it will be apparent that the horizontal scanning rate correction apparatus according to this invention can be used with cathode-ray tubes in video apparatus other than television receivers, such as, for example, in color computer terminals.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Horizontal scanning rate correction apparatus for a beam index color cathode ray tube having a display screen with beam-excitable color elements to be scanned by an electron beam as the latter is modulated by color control signals applied through color switching circuitry, and index elements which are scanned by said beam as the latter scans said display screen, said apparatus comprising:

beam deflection means supplied with at least horizontal and vertical deflection signals for causing said beam to repeatedly scan across said screen in a vertical succession of horizontal lines;

means for generating an index signal in response to the scanning of said index elements by said beam, the frequency of said index signal being determined by the frequency of incidence of said beam upon said index elements as it scans across said horizontal lines;

means for controlling the operation of said color switching circuitry in response to said index signal so that said color switching circuitry sequentially switches said color control signals individually for modulating said electron beam as said beam scans the respective ones of said color elements; and means for compensating for delay errors in said means for controlling by further controlling the scanning of said beam repeatedly across said screen whereby said electron beam scans said color elements in correspondence with the modulation of said electron beam by said respective color control signals, said means for compensating including:

memory means for storing a plurality of correction values representing deviation of the horizontal scanning rate of said electron beam from a desired scanning rate at each of a plurality of horizontal sampling positions along at least one of said horizontal lines, said correction values being obtained from said means for controlling when said at least one horizontal line is scanned by the beam in accordance with said horizontal and vertical beam deflection signals;

reading means for reading said correction values from said memory means and for producing a deflection correction signal in accordance with said correction values being read; and means for supplying said deflection correction signal to said beam deflection means so that said deviation of the horizontal scanning rate is substantially cancelled.

2. Horizontal scanning rate correction apparatus according to claim 1; in which said index elements are spaced in the direction of said horizontal lines so that the frequency of said index signal varies in proportion to variations in said horizontal scanning rate, and in which said correction values indicate changes in the frequency of said index signal.

3. Horizontal scanning rate correction apparatus according to claim 2; in which said means for controlling includes a phase-locked loop which has a phase comparator receiving said index signal as one input, a voltage-controlled oscillator, means connected to the output of said phase comparator for supplying said output as a control voltage to said voltage controlled oscillator, and means for supplying a second input signal to said phase comparator the frequency of which is controlled by the output of said voltage-controlled oscillator; and in which said correction values are derived from said control voltage supplied to said voltage-controlled oscillator.

4. Horizontal scanning rate correction apparatus according to claim 3; in which said correction values are stored in the form of digital values which have been derived from said control voltage by means of analog-to-digital conversion; and in which said reading means includes means for converting said digital values into corresponding analog voltages for use as said deflection correction signal.

5. Horizontal scanning rate correction apparatus according to claim 1; in which said beam deflection means comprises horizontal and vertical deflection coils for receiving said horizontal and vertical beam deflection signals, respectively, and a correction coil separate from said horizontal and vertical deflection coils for receiving said deflection correction signal.

6. Horizontal scanning rate correction apparatus according to claim 1; in which said memory means includes a read-only memory for storing said correction values in digital form; and in which said correction values are obtained from said means for controlling and are written in said read-only memory by means of circuitry external to said horizontal scanning rate correction apparatus.

7. Horizontal scanning rate correction apparatus according to claim 1; in which said means for compensating further includes writing means for obtaining said correction values from said means for controlling and for writing said correction values in said memory means, and mode switching means for switching said apparatus between a READ mode in which said reading means and said means for supplying said deflection correction signal to said beam deflection means are both operative and a WRITE mode in which said writing means is operative.

8. Horizontal scanning rate correction apparatus according to claim 7; in which said cathode-ray tube has an electrode to which a signal is supplied for controlling the intensity of said electron beam, and in which said apparatus further comprises means for supplying a constant signal to said electrode when said mode switching means switches said apparatus to said WRITE mode.

9. Horizontal scanning rate correction apparatus according to claim 1; in which said memory means includes means for storing said correction values which represent the deviation of the horizontal scanning rate at each of a plurality of said horizontal sampling positions for each of a plurality of said horizontal lines.

10. Horizontal scanning rate correction apparatus according to claim 1; in which said memory means stores said correction values for each of a plurality of said horizontal sampling positions along only one of said horizontal lines and said reading means includes means for multiplying said deflection correction signal by a coefficient that varies as a function of the vertical position of the horizontal line currently being scanned by said beam.

* * * * *